United States Patent [19]

Branning

[11] Patent Number: 4,954,547

[45] Date of Patent: Sep. 4, 1990

[54] USE OF FATTY ACIDS FOR IMPROVEMENT IN SHEAR STABILITY OF WATER-IN-OIL EMULSIONS

[75] Inventor: Merle L. Branning, Warrenville, Ill.

[73] Assignee: Nalco Chemical Company, Naperville, Ill.

[21] Appl. No.: 158,103

[22] Filed: Feb. 16, 1988

Related U.S. Application Data

[63] Continuation of Ser. No. 41,492, Apr. 23, 1987, abandoned.

[51] Int. Cl.$^5$ ............................................. C08K 5/20
[52] U.S. Cl. .................................. 524/232; 524/230; 524/322
[58] Field of Search ..................... 524/230, 232, 322

[56] References Cited

U.S. PATENT DOCUMENTS

| | | | |
|---|---|---|---|
| Re. 28,474 | 7/1974 | Anderson et al. | 524/555 |
| Re. 28,576 | 12/1975 | Anderson et al. | 523/336 |
| 3,284,393 | 11/1966 | Vanderhoff et al. | 524/801 |
| 3,390,959 | 7/1968 | Sibert | 423/122 |
| 3,624,019 | 11/1971 | Anderson et al. | 523/336 |
| 3,981,844 | 9/1976 | Romankiw | 252/62.52 |
| 3,996,180 | 12/1976 | Kane | 524/801 |
| 3,997,492 | 12/1976 | Kane et al. | 524/801 |
| 4,024,097 | 5/1977 | Slovinsky et al. | 524/273 |
| 4,162,143 | 7/1979 | Yount, III | 252/311.5 |
| 4,417,016 | 11/1983 | Cline et al. | 524/221 |
| 4,506,051 | 3/1985 | Rance | 524/233 |
| 4,585,820 | 4/1986 | Défago et al. | 524/232 |
| 4,647,610 | 3/1987 | Sperry et al. | 524/322 |

*Primary Examiner*—Joseph L. Schofer
*Assistant Examiner*—J. M. Reddick
*Attorney, Agent, or Firm*—John S. Roberts, Jr.; Donald G. Epple; Anthony L. Cupoli

[57] ABSTRACT

Fatty acids of fatty alkanolamides improve the shear stability of water-in-oil emulsions of acrylic acid polymers. Other advantages are afforded when fatty acids are used with these emulsions.

1 Claim, 2 Drawing Sheets

EFFECT OF FATTY ACID CHEMISTRY ON MECHANICAL STABILITY OF COMPOSITION A

USE OF FATTY ACIDS FOR IMPROVEMENT IN SHEAR STABILITY OF WATER-IN-OIL EMULSIONS

This is a continuation of co-pending application Ser. No. 041,492 filed on 4-23-87, now abandoned.

INTRODUCTION

A variety of water-soluble polymers may be prepared in the form of water-in-oil emulsions. See U.S. Pat. No. 3,284,393 which is incorporated herein by reference. When these emulsions are added to water in the presence of a water-soluble surfactant, they invert and allow the water-soluble polymers contained in the emulsion to rapidly dissolve in the water. These solubilization techniques are described in RE 28,474 and RE 28,576, the disclosures of which are incorporated herein by reference.

A common water-soluble polymer that is easy to synthesize in emulsion form and used in a variety of industrial applications in the form of dilute aqueous solutions thereof are the water-in-oil emulsions of acrylic acid polymers. Acrylic acid polymers include not only the water soluble forms of acrylic acid, e.g. the alkali metal, ammonia or amine salt and forms thereof, but also includes copolymers of acrylic acid which contian as little as 50% by weight of acrylic acid. Typical of such polymers are acrylamide and sodium or ammonium acrylate copolymers.

Acrylic acid polymers in the emulsion form find application in the treatment of sodium aluminate solutions to remove the red mud impurities which solutions are formed by the practice of the Bayer process. For details of this technology, see Sibert, U.S. Pat. No. 3,390,959, the disclosure of which is incorporated here.

The inversion of these water-in-oil emulsions of acrylic acid polymers as described above is usually accomplished by means of pumps which mix the emulsions which usually contain the water-soluble surfactant-inverting agent with the water into which the acrylic acid polymer is to be dissolved. Experience has shown that the shear effects imparted to the emulsions by these devices tend to cause the emulsions to prematurely break which results in the formation of polymer gel particles. These gel particles can cause clogging of circulating lines, screens, pump orifices, and the like. If it were possible to find a method to prevent the formation of these gels when water-in-oil emulsions of acrylic acid polymers are subject to conditions of shear, then an advance in the art would be afforded.

THE INVENTION

In its broadest aspects, the invention comprises a water-in-oil emulsion of a water-soluble acrylic acid polymer which contains an acrylic acid polymer, a water-in-oil emulsifying agent, and between 0.5–5% by weight of a $C_{12}$–$C_{22}$ fatty acid. The fatty acid imparts to the emulsion improved shear stability and superior inversion characteristics when the water-in-oil emulsion is added to water, particularly high pH waters.

THE WATER-IN-OIL EMULSIONS OF WATER-SOLUBLE ACRYLIC ACID POLYMERS

The water-in-oil emulsions of water-soluble acrylic acid polymers useful in this invention contain four basic components. These components and their weight percentages in the emulsions are listed below:

A. Water-soluble acrylic acid polymer:
  1. Generally from 5–60%;
  2. Preferably from 20–50%; and
  3. Most preferably from 35–45%;
B. Water:
  1. Generally from 20–90%;
  2. Preferably from 20–70%; and
  3. Most preferably from 30–55%;
C. Hydrophobic liquid:
  1. Generally from 5–75%;
  2. Preferably from 5–40%; and
  3. Most preferably from 20–30%; and
D. Water-in-oil emulsifying agent:
  1. Generally from 0.1–20%;
  2. Preferably from 1–15%;
  3. Most preferably from 1.2–10%.

It is also possible to further characterize the water-in-oil emulsions of water-soluble acrylic acid polymers with respect to the aqueous phase of the emulsions. This aqueous phase is generally defined as the sum of the polymer or copolymer present in the emulsion plus the amount of water present in the emulsion. This terminology may also be utilized in describing the water-in-oil emulsions which are useful in this invention. Utilizing this terminology, the aqueous phase of the water-in-oil emulsions of this invention generally consists of 25–95% by weight of the emulsion. Preferably, the aqueous phase is between 60–90% and most preferably from 65–85% by weight of the emulsion.

The emulsions also may be characterized in relation to the water/oil ratios. This figure is simply a ratio of the amount of water present in the emulsion divided by the amount of hydrophobic liquid present in the emulsion. Generally, the water-in-oil emulsions of this invention will have a water/oil ratio of from 0.25 to 18. Preferably, the water-in-oil ratio will range from 0.5–14, and most preferably from 1.0–2.75.

It is also contemplated within the scope of the invention to use emulsions of the type described above which have been treated to remove substantially all the water therefrom.

THE WATER-SOLUBLE ACRYLIC ACID POLYMERS

As indicated, the acrylic acid polymers include not only acrylic acid and its water-soluble salts but also the copolymers with other water-soluble vinyl monomers such as acrylamide, methacrylamide, vinylpyrrolidone, itaconic acid, fumaric acid, and the like. In many cases, methacrylic acid polymers can be substituted as equivalents for the acrylic acid polymers.

When the polymers of the above type are used to remove the red mud impurities from aqueous solutions of sodium aluminate in the primary settlers initially occuring in the process for manufacture of alumina by the Bayer Process, it is customary to use acrylic acid homopolymers. When these settled red muds are washed in the Washer Train, the alkalinities drop and acrylic acid copolymers are preferred. The molecular weights of both homopolymers and copolymers are preferably greater than 500,000 and are usually in excess of one million.

THE HYDROPHOBIC LIQUIDS

The hydrophobic liquids or oils used in preparing these emulsions may be seleced from a large group of organic liquids which include liquid hydrocarbons and substituted liquid hydrocarbons.

A preferred group of organic liquids that can be utilized in the practice of this invention are paraffinic hydrocarbon oils. Examples of these types of materials include a branched-chain isoparaffinic solvent sold by Humble Oil and Refinery Company under the tradename "Isopar M" described in U.S. Pat. No. 3,642,019 and a paraffinic solvent sold by the Exxon Company, U.S.A. called "Low Odor Paraffinic Solvent". Typical specifications of this material are set forth below in Table I.

TABLE I

| Specific Gravity 60°/60° F. | 0.780–0.806 |
| --- | --- |
| Color, Saybolt | + 30 min. |
| Appearance, visual | Bright and Clear |
| Aniline Point, °F., ASTM D-611 | 160 min. |
| Distillation, °F., ASTM D-86 | |
| IBP | 365 min. |
| FBP | 505 max. |
| Flash Point, °F., TCC | 140 min. |
| Sulfur, ppm, Microcoulometer | 15 max. |

While paraffinic oils are the preferred materials for use in preparing the water-in-oil emulsions of this invention, other organic liquids can be utilized. Thus, mineral oils, kerosenes, naphthas, and in certain instances petroleum may be used. While useful in this invention, solvents such as benezene, xylene, toluene, and other water immiscible hydrocarbons having low flash points or toxic properties are generally avoided due to problems associated with their handling.

THE WATER-IN-OIL EMULSIFYING AGENTS

Any conventional water-in-oil emulsifying agent can be used such as sorbitan monostearate, sorbitan monooleate, and the so-called low HLB materials which are all documented in the literature and are summarized in the Atlas HLB Surfactants Selector. Although the mentioned emulsifiers are used in producing good water-in-oil emulsions, other surfactants may be use as long as they are capable of producing these emulsions. It is also contemplated, however, that other water-in-oil emulsifying agents can be utilized.

U.S. Pat. No. 3,997,492 shows the use of emulsifiers generally having higher HLB values to produce stable emulsions similar in character to those discussed above. With the use of the equations present in this reference, which is hereinafter incorporated by reference, emulsifiers having HLB values between 4–9 can be utilized in the practice of this invention.

In addition to the reference described above, U.S. Pat. No. 4,024,097 discloses particular emulsifying agents for the water-in-oil emulsions, which are the subject of this invention. These emulsions are generally prepared according to this reference utilizing a water-in-oil emulsifying agent comprising a partially esterified lower N,N-dialkanol substituted fatty amide. Additionally, other surfactants may be combined to produce emulsions having small particle sizes and excellent storage stability.

THE PREPARATION OF THE WATER-IN-OIL EMULSIONS OF WATER-SOLUBLE ACRYLIC ACID POLYMERS

The general method for the preparation of emulsions of the type described above is contained in Vanderhoff, U.S. Pat. No. 3,284,393. A typical procedure for preparing water-in-oil emulsions of this type includes preparing an aqueous solution of a water-soluble acrylic acid monomer and adding the solution to one of the hydrocarbon oils described above. With the addition of a suitable water-in-oil emulsifying agent and under agitation, the emulsion is then subjected to free radical polymerization conditions and a water-in-oil emulsion of the water-soluble acrylic acid polymer is obtained. It should be pointed out that the ingredients are chosen based upon the weight percentages given above and their compatability with each other. As to choice of free radical catalyst, these materials may be either oil or water-soluble and may be from the group consisting of organic peroxides, Vazo type materials, redox type initiator systems, etc. Additionally, ultraviolet light, microwaves, etc. will also cause the polymerization of water-in-oil emulsions of this type.

In the manufacture of emulsions of this type, which are further detailed in U.S. Pat. No. 3,624,019, RE 28,474, U.S. Pat. No. 3,734,873, RE 28, 576, U.S. Pat. No. 3,826,771, all of which are incorporated by reference. The use of air may be employed to control polymerization. This technique is described in U.S. Pat. No. 3,767,629 which is also hereinafter incorporated by reference.

In addition to the above references, U.S. Pat. No. 3,996,180 describes the preparation of water-in-oil emulsions of the types utilized in this invention by first forming an emulsion containing small particle size droplets between the oil, water, monomer and water-in-oil emulsifying agent utilizing a high shear mixing technique followed by subjecting this emulsion to free radical polymerization conditions. Also of interest is U.S. Pat. No. 4,024,097 which describes water-in-oil emulsions such as those described above utilizing particular surfactant systems for the water-in-oil emulsifying agent, allowing for the preparation of latexes having small polymer particle sizes and improved storage stability.

Another reference, U.S. Pat. No. 3,915,920, discloses stabilizing water-in-oil emulsions of the type above described utilizing various oil-soluble polymers such as polyisobutylene. Employment of techniques of this type provides for superior stabilized emulsions.

Of still further interest in U.S. Pat. No. 3,997,492 which describes the formation of water-in-oil emulsions of the type above described.

PHYSICAL PROPERTIES OF THE WATER-IN-OIL EMULSIONS

The water-in-oil emulsions of the finely divided water-soluble acrylic acid polymers useful in this invention contain relatively large amounts of polymer. The polymers dispersed in the emulsion are quite stable when the particle size of the polymer is from the range of 0.1 microns up to about 5 microns. The preferred particle size is generally within the range of 0.2 microns to about 3 microns. A most preferred particle size is generally within the range of 0.2 to 2.0 microns.

The emulsions prepared having the above composition generally have a viscosity in the range of from 50 to 3,000 cps. It eill be seen, however, that the viscosity of these emulsions can be affected greatly by increasing or decreasing the polymer content, oil content, or water content as well as the choice of a suitable water-in-oil emulsifier.

What is important in this invention is the fact that the emulsion be somewhat fluid, i.e. pumpable.

THE INVERSION OF THE WATER-IN-OIL EMULSIONS OF THE WATER-SOLUBLE ACRYLIC ACID POLYMERS

The water-in-oil emulsions of the water-soluble acrylic acid polymers discussed above have unique ability to rapidly invert when added to aqueous solution in the presence of an inverting agent or physical stress. Upon inversion, the emulsion releases the polymer into water in a very short period of time when compared to the length of time required to dissolve a solid form of the polymer. This inversion technique is described in U.S. Pat. No. 3,624,019, hereinafter incorporated by reference. As stated in this reference, the polymer-containing emulsions may be inverted by any number of means. The most convenient means resides in the use of surfactant added to either the polymer-containing emulsion or the water into which it is to be placed. The placement of a surfactant into the water causes the emulsion to rapidly invert and release the polymer in the form of an aqueous solution. When this technique is used to invert the polymer-containing emulsions the amount of surfactant present in the water may vary over a range of 0.01 to 50% based on the polymer. Good inversion often occurs within the range of 1.0–10% based on polymer.

The preferred surfactants utilized to cause the inversion of the water-in-oil emulsion of this invention when the emulsion is added to water are hydrophillic and are further characterized as being water soluble. Any hydrophillic type surfactant such as ethoxylated nonyl phenols, ethoxylated nonyl phenol formaldehyde resins, dioctyl esters of sodium succinate and octyl phenol polyethoxy ethanols, etc. can be used. Preferred surfactants are generally nonyl phenols which have been ethoxylated with between 8–15 moles of ethylene oxide. A more complete list of surfactants used to invert the emulsion are found in Anderson, U.S. Pat. No. 3,624,019 at columns 4 and 5.

It has been found that the inversion agents described above may be substituted in whole or in part by $C_{12}$–$C_{22}$ fatty acids which substitution provides an improved water-in-oil emulsion composition which contains acrylic acid polymers. The advantage of using these fatty acids is three-fold. The most important advantage is that it stabilizes the emulsions against shear degradation when they are pumped through the high shear producing devices such as gear pumps. When these emulsions are exposed to such high shear mechanical devices, the emulsions can destabilize by forming gel-like particles if they are not shear stabilized. Therefore, this invention can be measured by the improvement of shear stability by exposing the improved emulsions to high shear mechanical stress and measuring the amount of gel particles formed. The lower the degree of gel formation observed, the better the shear stability.

The second advantage is that when the fatty acids are used as the inverting agent surfactant and the acrylic acid polymer emulsion containing them are added to high pH waters (e.g. greater than 9.5) such as those used to digest red mud to produce alumina, they provide complete and rapid dissolution of the polymer. Another advantage is that the fatty acids act in a dual capacity, e.g. in the emulsion they act as a water-in-oil emulsifying or co-emulsifying agent yet when added to an aqueous alkaline water they are converted to their water-soluble soap form thus making them a water-soluble surfactant.

THE FATTY ACIDS

The fatty acids used are those containing from 12–22 carbon atoms. The preferred fatty acids are the unsaturated acids containing at least 18 carbon atoms with a most preferred acid being oleic acid. It is understood that pure acids are not required to be used but so-called impure sources of fatty acids may be used such as the acids derived from vegetable oils and animal fats.

Thus, coconut oil fatty acids, palm oil fatty acids, corn oil fatty acids, tallow fatty acids, and the like may be used. Since the unsaturated acids give the best results as emulsion stabilizers, those acids derived from the vegetable oils are preferred.

To illustrate the advantages of the invention, the following are presented by way of example. Tests were run with two water-in-oil acrylic acid polymer compositions. These are set forth below as Comosition A and Composition B.

OTHER INGREDIENTS

The emulsions of the invention contain other ingredients which are present for the purpose of obtaining protection against possible contamination by the presence of hardness cations such as magnesium, calcium, and the like, as well as certain transition metal cations such as iron, manganese, and the like. This type of protection is achieved by adding certain compounds referred to hereafter and in Compositions A and B below as chelants. These chelants are not only chelating agents such as EDTA, NTA, and similar low molecular weight complexing agents for hardness ions and transition metal ions, but also may include such things as ammonium thiocyanate, sodium thiosulfate, and similar inorganic salts that can achieve protection for these emulsions for different purposes, such as the protection against possible contamination from the metal ions mentioned above. The chelants mentioned in Compositions A snd B below contain not only the chelating agents mentioned above but also the inorganic stabilizing agents mentioned above, preferably in a ratio ranging between about 10:1 to about 12:10,000.

| Composition A | |
|---|---|
| Components | Wt. % |
| Oil Phase | |
| Paraffinic oil | 25.447 |
| Sorbitan monooleate | 1.419 |
| Ethoxylated (4 moles) Sorbitan monostearate | 0.847 |
| Monomer Phase | |
| Acrylic acid | 31.880 |
| Ammonium hydroxide 28% solution | 26.886 |
| Chelants | 1.447 |
| D.I. water | 9.415 |
| Initiator | |
| Vazo catalyst | 0.059 |
| Activator | |
| HLB 12.5 nonionic surfactant | 2.000 |
| HLB 16.0 nonionic surfactant | 0.600 |
| | 100.00 |

| Composition B | |
|---|---|
| Components | Wt. % |
| LOPS | 25.0838 |

-continued

| Composition B | |
|---|---|
| Components | Wt. % |
| Sorbitan monooleate | 1.7128 |
| Ethxoylated (4 moles) Sorbitan monostearate | 1.0060 |
| Oleic acid | 0.6737 |
| Monomer Phase | |
| Acrylic acid | 22.1048 |
| Ammonium hydroxide anhydrous | 5.2249 |
| Acrylamide, 46.8% | 24.3964 |
| Chelants | 1.4491 |
| D.I. water | 16.4903 |
| Initiator | |
| Vazo catalysts | 0.0524 |
| Activator | |
| Oleic acid | 1.3000 |
| HLB 12.5 nonionic surfactant | 0.5000 |
| | 100.00 |

Composition was prepared using a procedure similar to those described in U.S. Re 28,474 and U.S. Re 28,576 which are incorporated herein by reference.

Several fatty acids and derivatives thereof were tested to determine their effect in preventing the gelling of Composition A under conditions of shear. These results are set forth in Table I.

The test method was as follows:

PRECENT GEL RECIRCULATION TEST METHOD

Method I

1. Fatty acid additives were added slowly to composition A under moderate mixing. Additional mixing was conducted for sixty (60) minutes.
2. 375 gm. of the resulting blend was added to the product recirculation pump and reservoir rig.
3. Recirculation (pump speed) was adjusted to allow complete product turn-over in one minute (375 gm/min).
4. A pump timer was then set for a two-hour period. This allowed the product to be recirculated 120 times through the gear pump.
5. Following recirculation time, the entire product was removed and the recirculation rig was cleaned thoroughly with an oil/emulsifier (90:10) recirculation and rinse.
6. 100 gm. of the recirculated product was thinned with a LOPS solvent (66:34) and poured through a tared 3 inch [100 mesh (150 microns) sieve]. (U.S.A. Standard Sieve)
7. The sieve was then rinsed well with the LOPS solvent and wiped dry (sieve bottom).
8. The sieve was then reweighed to determine the net weight of gel. (I.E. 0.5 gm. gel on sieve→0.5% gel in product).

CALCULATION:

$$\frac{0.5 \text{ gm. (gel on sieve)}}{100 \text{ gm. (weight of product put through sieve)}} \times 100 =$$

0.5% gel in product

TABLE I

| Additives Tested for Mechanical Stability of Composition A (100% Ammonium Acrylate) | |
|---|---|
| Additive & % (BOL) | % Gel in Recirculation |
| Blank (Composition A only) | 7.0% |
| 1:1 oleic/linoleic diethanolamide @ 0.5% | 5.3 |
| 1:1 oleic/linoleic diethanolamide @ 1.0% | 2.75 |
| 1:1 oleic/linoleic diethanolamide @ 2.0% | 0.7% |
| Tall oil fatty acid @ 1.0% | 0.25% |
| Blend of tall oil distillates @ 1.0% | 1.25% |
| Economical grade oleic acid @ 0.5% | 3.3% |
| Economical grade oleic acid @ 1.0% | 0.6–0.8% |
| Economical grade oleic acid @ 1.8% | 0.5 |
| Economical grade oleic acid @ 2.0% | 0.3–0.5% |

In Table I above the diethanolamide compounds are represented by the formula

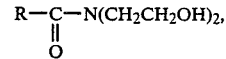

which is the amide derived from a 1:1 ratio mixture of oleic and linoleic acids. Ahtough the oleic acid is preferred, as can be seen, the 1:1 oleic/linoleic diethanolamide compounds also provide increased shear stability. Admixtures of these ingredients would be expected to provide similar mechanical stability to shear.

Method II

Same as above only composition B added to recirculation rig.

Results were that 0.5% gel was also formed.

Using the same general test method, additional tests were conducted and are reported in Table II.

TABLE II

| Composition A Type product Mechanical Stability Results | | |
|---|---|---|
| Activators & Levels (BOL)[1] | % Oleic Acid | % Gel (BOL-wt)[2] |
| 1.9% ethoxylated nonyl phenol, 0.9% Lauryl alcohol Rx 23 moles of EO | 0 | 17.8 |
| 2% ethoxylated nonyl phenol & 0.6% cetyl alcohol Rx 20 moles of EO | 0 | 5.2 |
| 2.0% ethoxylated nonyl phenol, 0.6% cetyl alcohol Rx 20 moles of EO | 0.5 | 3.3 |
| 2.0% ethoxylated nonyl phenol, 0.6% cetyl alcohol Rx 20 moles of EO | 1.0 | 0.8 |
| 2.0% ethoxylated nonyl phenol, 0.6% cetyl alcohol Rx 20 moles of EO | 2.0 | 0.5 |

[1] Based on latex — replacing normal activator in Composition A.
[2] Measure of shear stability Further tests were run showing the effect of various acids on Composition A to improve its shear stability. These results are set forth in FIGS. 1 and 2.

Figure 1:
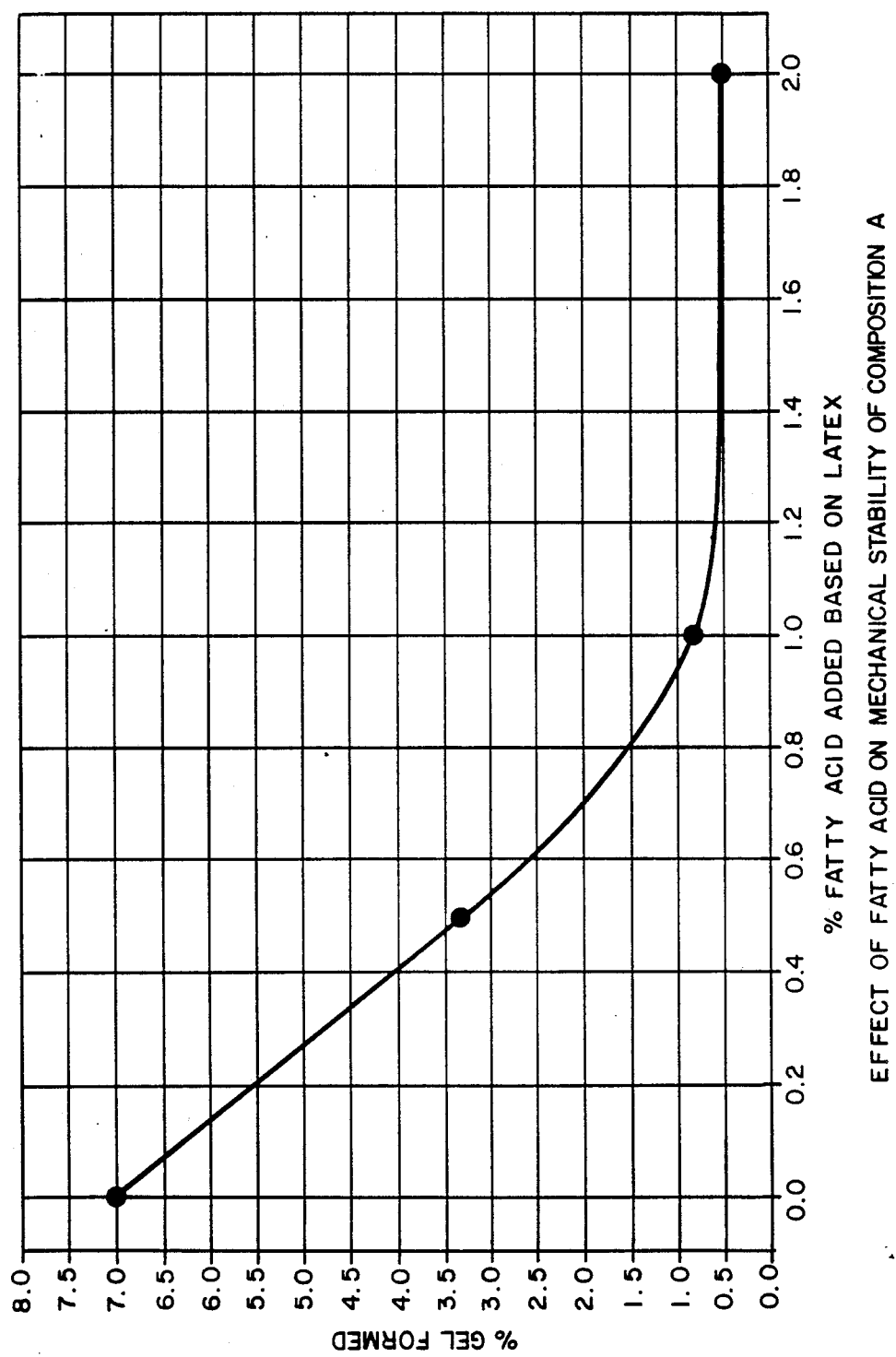
FIG. 1 showed percent fatty acids added based on latex. The effect of fatty acid on mechanical stability of composition A.
Figure 2:
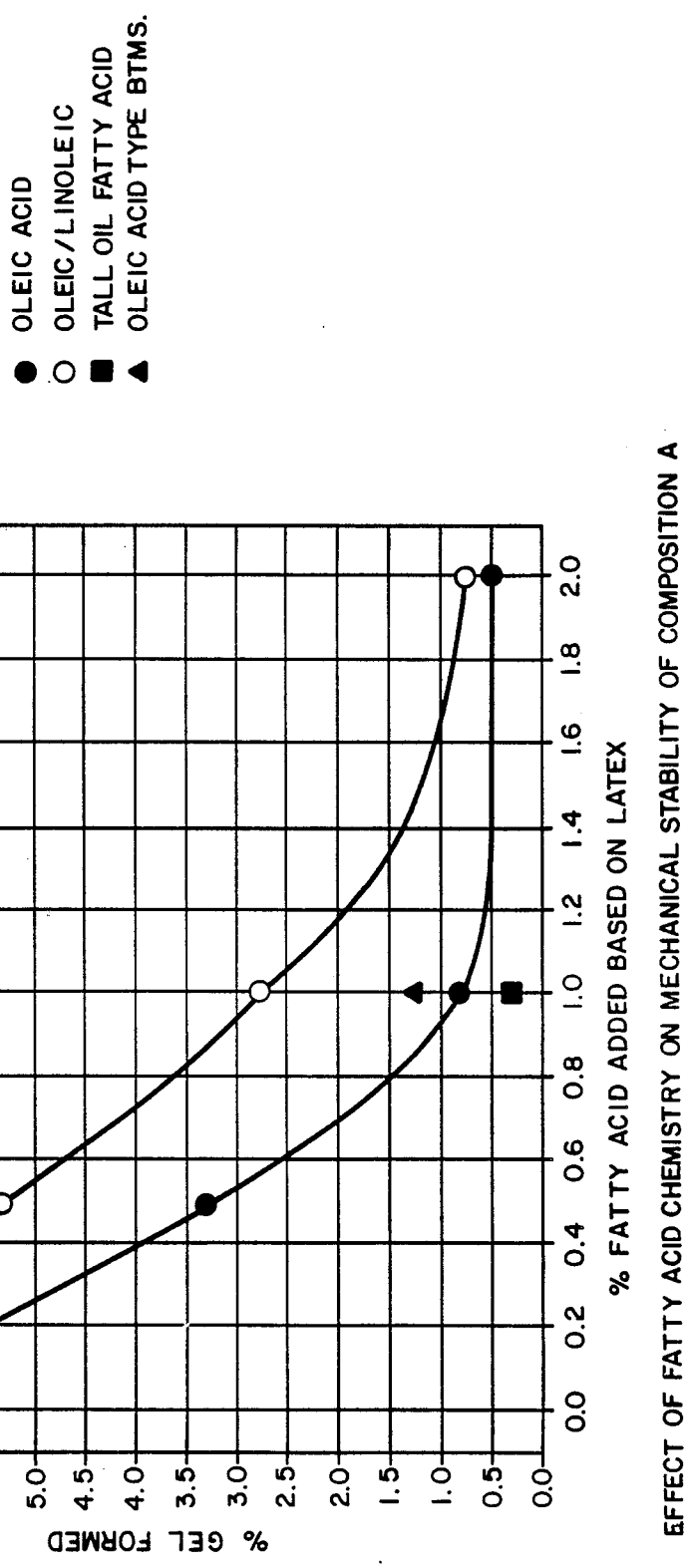
FIG. 2 shows the percent of fatty acid added based on latex. The effectg of fatty acid chemisty on mechanical stability of composition A.

Having thus described my invention, it is claimed:

1. A water-in-oil emulsion having improved mechanical shear stability which contains:
   a. water phase having dissolved therein a water-soluble acrylic acid polymer having a molecular weight of at least 500,000;
   b. an oil phase;
   c. a water-in-oil emulsifying agent; and additionally contains from 0.5 to 5.0 weight percent of a mechanical shear stabilizing agent of an admixture of oleic acid and a 1:1 mole ratio of oleic/linoleic diethanolamide, said shear stabilizing agent being further characterized as acting as an inverting agent which allows the water-soluble acrylic acid polymer to be dissolved rapidly in water.

* * * * *